June 5, 1934.  P. H. HYSER  1,961,932
ELECTRICAL CONDUCTOR
Filed Dec. 24, 1925
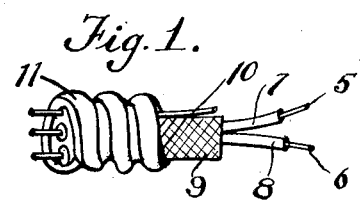
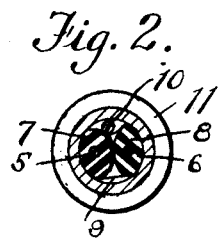 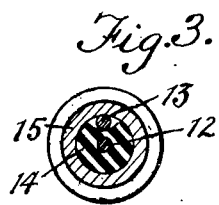
INVENTOR
Paul H. Hyser
BY Robert S. Allyn
ATTORNEY Patented June 5, 1934

1,961,932

UNITED STATES PATENT OFFICE 1,961,932

ELECTRICAL CONDUCTOR

Paul H. Hyser, Brooklyn, N. Y.

Application December 24, 1925, Serial No. 77,544

11 Claims. (Cl. 173—267)

My invention relates to what is sometimes called armored cable. The main object of the invention is to provide a reliable construction which can be made economically, and which is especially useful for house wiring systems and the like.

It has been customary in the past in multiple conducting wiring to insulate each wire and protect the insulated strands with some form of metallic armor. I propose to do away with the insulation of one of the wires and protect the two or more wires by a metallic covering which is in contact with one of the wires throughout substantially its entire length.

Fig. 1 is a fragmentary side view showing one form of conductor embodying my invention and having three wires with a flexible metallic armor of conventional form.

Fig. 2 is a transverse sectional view of a similar construction but with the bare wire in a different position.

Fig. 3 is a transverse sectional view of a two wire conductor.

In the three wire construction shown in Figs. 1 and 2, two of the three wires 5 and 6 are provided with a suitable form of insulation such as rubber composition such as 7 and 8. This pair may be covered with a braided or woven sheath 9 in the customary manner. The third wire 10 which will usually be the neutral, is uninsulated.

The armor 11 may be of the flexible metallic type, with the armor wound tightly about the wire 10 and the insulated wires 5 and 6 so as to securely hold all three in place so that they cannot be pulled out. The armor is of the usual helically wound type sometimes called "spirally" wound made from one or more strips usually of steel with the edges of the adjacent convolutions interlocked in the usual manner. The armor may be wound so as to impress the uninsulated or bare wire into the outer surface of the insulation of the insulated conductor or conductors. The uninsulated conductor has electrical contact with the armor and thus bridges the adjacent turns. In the form shown in Fig. 2, the wire 10 is forced part way between the insulation 7 and 8 on the wires 5 and 6 so as to economize space. It will thus be seen that the wire 10 is in contact with the armor 11. Both the wire 10 and the armor 11 would ordinarily be grounded. At any rate the neutral and the armor would be at the same potential. The armor itself will in effect serve as a conductor in case the wire 10 is broken or in case more or less of the wire 10 should be removed. This construction requires a minimum amount of insulating material and also on account of the smaller size of the armor, reduces the amount of the metal required, thus materially reducing the size and weight as well as the cost of the construction. This construction also facilitates identification of the neutral wire so that it is impossible to make a mistake in connecting the various wires in the system.

In the form shown in Fig. 3 there are only two conductors 12 and 13. The first is provided with a suitable sheath 14. The wire 13 is uninsulated and held in place by the wall of the armor 15. It will be obvious that if the wire 13 were provided with insulation, not only would the cost be substantially increased but the conduit or armor would necessarily be heavier and larger, and consequently more expensive, all the wires will of course be of substantially the same current carrying capacity. While, according to my system, it is entirely unnecessary to insulate one of the wires, I would not wish it thought that infringement could be avoided by providing the wire 10 or the wire 13 with a thin or ineffective layer of material actually non-insulating although by itself normally considered non-conducting.

It should be understood that the armor may be made non-corrosive by using a special alloy of steel or other metal, or coating or plating the same.

It should be understood that any usual type of wire may be used either of circular, or flat cross section or stranded, each type having its own advantages. So also it will be understood that the bare wire may be combined with the insulated wire or wires in the usual parallel or twisted relations.

Not only is a conductor involving my invention much smaller in size and therefore easier to install, but it is much lighter in weight and therefore less expensive to ship, and furthermore, there is a substantial saving in the material required.

I claim:—

1. The system of electric distribution which includes a grounded metallic armor containing a conductor wire in electrical contact therewith and serving as one conductor of the circuit, and a second wire contained within the armor and insulated completely from the armor and from the first named wire and serving as a second conductor of the circuit, the armor consisting of a flexible, helically wound metallic strip tightly embracing the insulated and uninsulated wires, the said wires being of substantially the same current carrying capacity, and the said armor and the wire in contact therewith being of the same potential at substantially every cross section thereof.

2. An electric distribution cable comprising an insulated conductor and an uninsulated conductor extending substantially parallel therewith and a flexible helically wound metallic armor tightly embracing the insulated and uninsulated wires, the uninsulated wire and the armor being in electrical engagement throughout their lengths and grounded.

3. An electric distribution cable for a three wire system comprising two insulated conductors and a neutral uninsulated conductor and a flexible metallic armor helically wound about the two insulated wires and in electrical contact with the uninsulated wire, the neutral wire and the armor being at the same potential.

4. An electric distribution cable comprising a completely insulated conductor and an uninsulated conductor extending in contact with each other, and a flexible helically wound metallic armor closely embracing said conductors throughout their lengths, said uninsulated conductor being in electrical contact with the successive turns of the metallic armor.

5. The combination with an insulated conductor and a spirally wound metal armor around the insulation of the conductor composed of interlocking turns, of a safety conductor constituting an electric bridge located inside of the armor, insulated from the first-mentioned conductor, and contacting with substantially all of the turns of the armor, said armor tightly embracing said insulated conductor and said safety conductor.

6. The combination with an insulated conductor and a safety conductor, of a spirally wound metal armor composed of interlocking turns enclosing said insulated conductor and said safety conductor under pressure, said safety conductor contacting with substantially all of the turns of said armor to constitute an electric bridge.

7. In an armored electric cable the combination with a plurality of insulated electric conductors and a bare electric bond wire disposed in longitudinal relation, of a spirally wound metal armor of interlocking turns tightly embracing said conductors and bond wire so that the bond wire is partially impressed in said insulated conductors and held in contact with the turns of the armor.

8. A flexible cable comprising the combination with an insulated conductor and a helically wound metal armor around the insulation of the conductor and composed of contacting turns, of an uninsulated conductor of substantially the same current carrying capacity as the insulated conductor constituting an electric bridge located inside of the armor, insulated from the first-mentioned conductor and contacting with substantially all of the turns of the armor, said armor tightly embracing said insulated conductor and said uninsulated conductor so as to prevent said conductors from being pulled out from the armor.

9. A flexible cable comprising the combination with an insulated conductor and a bare conductor, of a helically wound metal armor composed of contacting turns enclosing said insulated conductor and said bare conductor under pressure, said bare conductor contacting with substantially all of the turns of said armor so as to constitute an electric bridge between the turns, said bare wire and said armor being grounded.

10. In a flexible armored electric cable the combination with a plurality of insulated electric conductors and an uninsulated electric bond wire disposed in substantially parallel longitudinal relation, of a helically wound metal armor of contacting turns tightly embracing said conductors and bond wire so that the bond wire is partially impressed in said insulated conductors and held in contact with the turns of the armor so that the conductors can not be pulled out of the armor.

11. In a three wire distribution system, the combination of a flexible cable composed of two insulated wires and an uninsulated neutral wire partially embedded between the insulation of the two wires throughout their lengths and a helically wound metallic armor having contacting turns tightly embracing said wires under pressure, said armor and said uninsulated wire being in electrical contact and grounded.

PAUL H. HYSER.